(12) United States Patent
Mathew et al.

(10) Patent No.: US 11,308,380 B1
(45) Date of Patent: Apr. 19, 2022

(54) REMOVABLE NON-VOLATILE STORAGE CARD

(71) Applicant: Innogrit Technologies Co., Ltd., Shanghai (CN)

(72) Inventors: Abhilash Mathew, Santa Clara, CA (US); Yanwen Bai, Shanghai (CN); Gang Zhao, Chandler, AZ (US); Shiann-Ming Liou, Campbell, CA (US); Lin Chen, Cupertino, CA (US)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 17/183,783

(22) Filed: Feb. 24, 2021

(51) Int. Cl.
*G06K 19/077* (2006.01)
(52) U.S. Cl.
CPC .. *G06K 19/07732* (2013.01); *G06K 19/07743* (2013.01); *G06K 19/07745* (2013.01)
(58) Field of Classification Search
CPC ....... G06K 19/07732; G06K 19/07743; G06K 19/07745; G06K 19/077; G06K 19/07733
See application file for complete search history.

(56) References Cited

U.S. PATENT DOCUMENTS

| | | | | |
|---|---|---|---|---|
| 5,231,274 A * | 7/1993 | Reynier | ............... | G06K 7/0021 235/441 |
| 6,264,506 B1 * | 7/2001 | Yasufuku | ............ | G06K 7/0021 439/638 |
| 6,481,633 B1 * | 11/2002 | Washino | .............. | G06K 7/0047 235/492 |
| 6,527,590 B2 * | 3/2003 | Oguchi | ................ | G06K 7/0021 439/630 |
| 6,568,960 B2 * | 5/2003 | Bricaud | ............... | G06K 7/0052 439/630 |
| 6,669,487 B1 * | 12/2003 | Nishizawa | ......... | G06K 19/0719 361/737 |
| 6,716,066 B1 * | 4/2004 | Kuo | ..................... | G06K 7/0034 361/737 |
| 6,721,186 B2 * | 4/2004 | Yang | .................... | G06K 19/077 361/671 |
| 6,896,523 B2 * | 5/2005 | Nishizawa | ............ | G06K 19/07 439/60 |
| 7,009,846 B1 * | 3/2006 | Wang | ................... | H05K 5/0286 235/492 |
| 7,095,618 B1 * | 8/2006 | Mambakkam | ......... | G06F 13/38 235/492 |

(Continued)

*Primary Examiner* — Daniel I Walsh
(74) *Attorney, Agent, or Firm* — IPro, PLLC; Xiaomin Huang

(57) ABSTRACT

Systems and apparatus are provided for a removable non-volatile storage device. An exemplary embodiment may provide an apparatus that may comprise a package that may have a first and a second sets of contact pins. The package may have a dimension and the first set of contact pins may be arranged according to a specification of a first type of storage device. The second set of contact pins may be configured to conduct a subset of electrical signals for a second type of storage device. The package may further comprise a controller inside the package and configured to function as the first type of storage device when the first set of contact pins are electrically connected to a host and as the second type of storage device when both the first set and the second set of contact pins are electrically connected to the host.

7 Claims, 3 Drawing Sheets

(56) References Cited

U.S. PATENT DOCUMENTS

| | | | | |
|---|---|---|---|---|
| 7,179,129 | B1* | 2/2007 | Hwang | G06K 19/07 439/630 |
| 7,485,952 | B1* | 2/2009 | Miks | G06K 19/07732 257/667 |
| 7,862,381 | B2* | 1/2011 | Miller | H01R 13/642 439/630 |
| 9,047,547 | B2* | 6/2015 | Okada | G06K 19/07743 |
| 11,055,499 | B2* | 7/2021 | Inagaki | G06F 13/385 |
| 2001/0010984 | A1* | 8/2001 | Bricaud | G06K 7/0052 439/630 |
| 2003/0201322 | A1* | 10/2003 | Wu | G06K 7/0047 235/441 |
| 2003/0229746 | A1* | 12/2003 | Liu | G06K 19/077 710/301 |
| 2004/0164170 | A1* | 8/2004 | Krygier | G06Q 20/341 235/492 |
| 2005/0230483 | A1* | 10/2005 | Miller | G06K 19/07743 235/492 |
| 2005/0258243 | A1* | 11/2005 | Hsieh | G06K 7/0047 235/441 |
| 2006/0014436 | A1* | 1/2006 | Wu | H01R 13/64 439/630 |
| 2006/0264110 | A1* | 11/2006 | Mambakkam | H01R 29/00 439/630 |
| 2007/0145152 | A1* | 6/2007 | Jogand-Coulomb | G06K 19/07 235/492 |
| 2007/0208889 | A1* | 9/2007 | Irisawa | G06F 13/387 710/33 |
| 2009/0100207 | A1* | 4/2009 | Jones | G06F 13/38 710/301 |
| 2010/0081297 | A1* | 4/2010 | Miller | H01R 27/00 439/60 |
| 2017/0154003 | A1* | 6/2017 | Han | G06K 13/08 |
| 2018/0088865 | A1* | 3/2018 | Lee | G06K 19/07743 |
| 2018/0113776 | A1* | 4/2018 | Lee | G06F 1/3215 |
| 2019/0182954 | A1* | 6/2019 | Sirajudeen | H01R 12/714 |
| 2019/0377516 | A1* | 12/2019 | Rao | G06F 3/0659 |
| 2020/0090020 | A1* | 3/2020 | Fujimoto | G06K 19/07732 |
| 2020/0233818 | A1* | 7/2020 | Hsieh | G06F 13/1668 |
| 2021/0042256 | A1* | 2/2021 | Swett | H01R 27/02 |
| 2021/0056375 | A1* | 2/2021 | Lotya | H05K 1/165 |
| 2021/0152740 | A1* | 5/2021 | Abe | H04N 5/23241 |
| 2021/0157763 | A1* | 5/2021 | Jabori | G06F 13/385 |
| 2021/0192312 | A1* | 6/2021 | Lotya | H05K 3/0061 |

\* cited by examiner

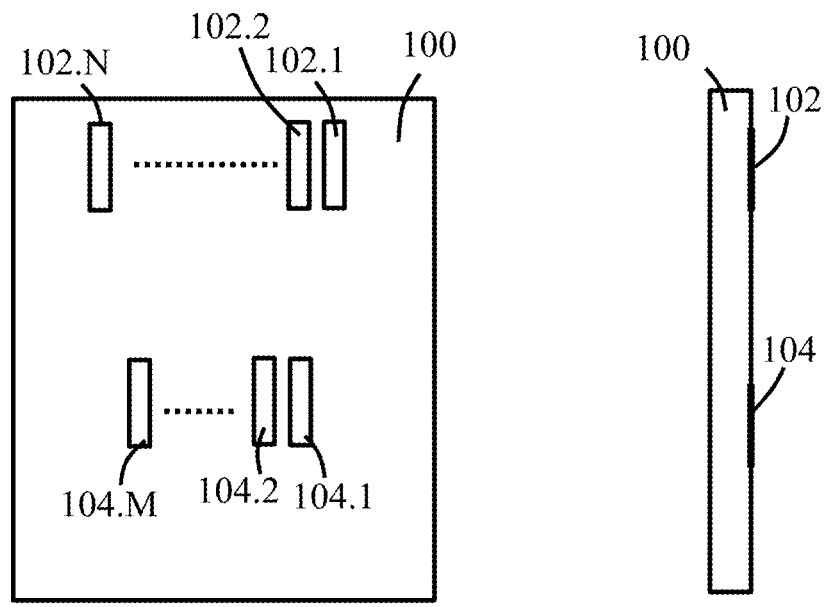
FIG. 1A  FIG. 1B
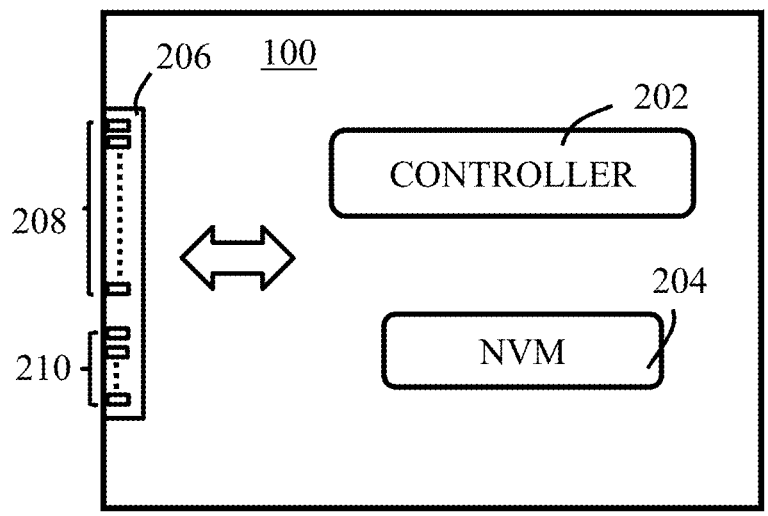
FIG. 2

REMOVABLE NON-VOLATILE STORAGE CARD

TECHNICAL FIELD

The disclosure herein relates to non-volatile storage systems, particularly relates to removable non-volatile storage cards.

BACKGROUND

Digital cameras and digital movie cameras capture images in digital memory. A wide variety of removable non-volatile storage cards have been developed to store the images. A lot of these cards are not compatible with each other. A camera normally has a card slot designed for one type of card and cannot use other type of cards. Therefore, one type of cards normally can only be used in the cameras specifically designed to use this type of cards. For example, the CompactFlash Association's CFEXPRESS 2.0 specification includes three types of cards, Type A, Type B and Type C. These three different types of cards have different dimensions, different sets of pins, and different layout of pins, and thus are not interchangeable. Therefore, there is a need in the art for a removable non-volatile storage card that can be used as multiple types of card.

SUMMARY

The disclosed subject matter relates to a removable non-volatile storage card that may be used as different types of card and an adapter for the removable non-volatile storage card to adapt from a first type to a second type. In an exemplary embodiment, there is provided an apparatus that may comprise a package having a first set of contact pins and a second set of contact pins. The package may have a dimension in accordance with a specification of a first type of storage device. The first set of contact pins may be arranged according to the specification of the first type of storage device. The second set of contact pins may be configured to conduct a subset of electrical signals for a second type of storage device. The package may further comprise a controller inside the package, and the controller may be configured to function as the first type of storage device when the first set of contact pins are electrically connected to a host and as the second type of storage device when both the first set of contact pins and the second set of contact pins are electrically connected to the host.

In another exemplary embodiment, there is provided an apparatus that may comprise a first cover and a second cover forming a slot between the first cover and the second cover, and a first set of elastic contact pins and a second set of elastic contact pins arranged in an inner surface of the slot. The slot may have a dimension in accordance with a specification of a first type of storage device, the first cover and the second cover may form a card shape that may have a dimension in accordance with a specification of a second type of storage device. The first set of elastic contact pins may be arranged to make electrical contact with a first set of contact pins of a removable non-volatile storage card according to the specification of the first type of storage device, the second set of elastic contact pins may be arranged to make electrical contact with a second set of contact pins of the removable non-volatile storage card to conduct a subset of electrical signals for the second type of storage device. The apparatus may further comprise a set of recessed pins arranged in accordance with a specification of the second type of storage device. The set of recessed pins may be electrically connected to the first set and second set of elastic contact pins.

BRIEF DESCRIPTION OF FIGURES

FIG. 1A schematically shows a removable non-volatile storage card in accordance with an embodiment of the present disclosure.

FIG. 1B schematically shows a side view of the removable non-volatile storage card in accordance with an embodiment of the present disclosure.

FIG. 2 schematically shows electronical components of a removable non-volatile storage card in accordance with an embodiment of the present disclosure.

DETAILED DESCRIPTION

Figure 3:
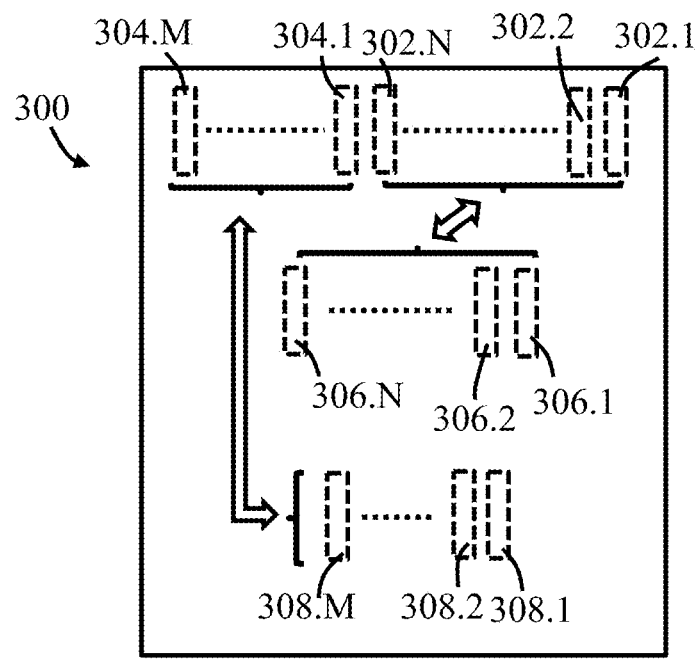
FIG. 3 schematically shows a card adapter in accordance with an embodiment of the present disclosure.

Specific embodiments according to the present disclosure will now be described in detail with reference to the accompanying figures. Like elements in the various figures are denoted by like reference numerals for consistency.

The present disclosure provides apparatuses, systems and methods that support various non-volatile memory (NVM) devices. As used herein, a non-volatile memory device may be a non-volatile storage device that can maintain stored information after being powered off, and the stored information may be retrieved after being power cycled (turned off and back on). Non-volatile storage devices may be NAND flash memories, NOR flash memories, Magnetoresistive Random Access Memory (MRAM), Resistive Random Access Memory (RRAM), Phase Change Random Access Memory (PCRAM), Nano-RAM, etc. A NAND flash may be used an example for the proposed techniques. However, various embodiments according to the present disclosure may implement the techniques with other kinds of non-volatile storage devices.

FIG. 1A schematically shows a top view of a removable non-volatile storage card 100 in accordance with an embodiment of the present disclosure. The removable non-volatile storage card 100 may comprise two sets of contact pins exposed on the surface of the package. The first set of contact pins may include contact pins 102.1 through 102.N and the second set of contact pins may include contact pins 104.1 through 104.M. The dimension of the removable non-volatile storage card 100 may conform to a specification for a first type of removable non-volatile storage card. And the first set of contact pins 102.1 through 102.N may be arranged in accordance with the specification for the first type of removable non-volatile storage card. In one embodiment, the first type of removable non-volatile storage card may be the CFEXPRESS Type A card. In this embodiment, the number of pins (e.g., the number N) may be equal to 13, and arranged and exposed in the position in accordance with the CFEXPRESS Type A card specification. The dimension of the removable non-volatile storage card 100 may conform to the dimension specification of CFEXPRESS Type A card.

The second set of contact pins 104.1 through 104.M may be configured to conduct a subset of electrical signals for the removable non-volatile storage card 100 to be used as a second type of removable non-volatile storage card. The second type of removable non-volatile storage card may have more contact pins than the first type of removable non-volatile storage card. In one embodiment, the second type of removable non-volatile storage card may be the CFEXPRESS Type B card. For example, a CFEXPRESS Type B card may need 21 contact pins. 13 contact pins of these 21 contact pins may be configured to carry electrical signals the same as the 13 contact pins of a CFEXPRESS Type A card and the other remaining 8 contact pins of the CFEXPRESS Type B card may be extra contact pins compared to the CFEXPRESS Type A card. In one embodiment, the second set of contact pins 104.1 through 104.M may be configured to carry the subset of electrical signals corresponding to the eight extra pins of the CFEXPRESS Type B card.

FIG. 1B schematically shows a side view of the removable non-volatile storage card 100 in accordance with an embodiment of the present disclosure. The first set of the contact pins 102.1 through 102.N may be exposed and aligned along a top edge of the removable non-volatile storage card 100, and thus as shown in the side view, the contact pins 102.1 through 102.N may be collectively labeled as 102. Also, in the embodiment shown in FIG. 1A the second set of contact pins 104.1 through 104.M may also be exposed and aligned on the same surface of the package of the removable non-volatile storage card 100, and thus as shown in the side view, the contact pins 104.1 through 104.M may be collectively labeled as 104.

It should be noted that there is no requirement as to where the second set of contact pins 104.1 through 104.M must be positioned, or whether the second set of contact pins 104.1 through 104.M must be aligned. In some embodiments, for example, the second set of contact pins 104.1 through 104.M may be on an opposite surface of the package of the removable non-volatile storage card 100. That is, if the surface of the contact pins 102.1 through 102.N is the front surface, then the contact pins 104.1 through 104.M may be on the back surface. In another embodiment, some of the contact pins 104.1 through 104.M may be on one surface of the package of the removable non-volatile storage card 100 and remaining pins of the contact pins 104.1 through 104.M may be on the other surface of the package of the removable non-volatile storage card 100. Moreover, in some embodiments, the contact pins 104.1 through 104.M may be scattered on one surface (e.g., the front or the back) or both surfaces (e.g., the front and back), without being aligned in one line. In addition, one or more of the contact pins 104.1 through 104.M may be arranged on a side (e.g., the side shown in the side view of FIG. 1B, which may be the left side of FIG. 1A, or the right side of FIG. 1A), or two sides (e.g., the left and right sides of FIG. 1A).

FIG. 2 schematically shows electronical components of the removable non-volatile storage card 100 in accordance with an embodiment of the present disclosure. The removable non-volatile storage card 100 may comprise a controller 202, a non-volatile memory (NVM) device 204 and an interface 206. The interface 206 may conform to a standard, such as the Peripheral Component Interconnect Express (PCIe) 3.0 specification. The electrical contacts of the interface 206 may include two sets of electrical contacts 208 and 210. The set of electrical contacts 208 may comprise N electrical contacts with each being electrically coupled to a respective contact pin of the set of contact pins 102.1 through 102.N on the surface of the package of the removable non-volatile storage card 100. The set of electrical contacts 210 may comprise M electrical contacts with each being electrically connected to a respective contact pin of the set of contact pins 104.1 through 102.M on the surface of the package of the removable non-volatile storage card 100. In the embodiment in which the removable non-volatile storage card 100 may be a CFEXPRESS TYPE A card and also may be used as a CFEXPRESS TYPE B card, N may be 13 and M may be 8. It should be noted that the removable non-volatile storage card 100 may comprise a plurality of NVM devices and the NVM device 204 may be a representative of the plurality of NVM devices.

The controller 202 may be configured to work in multiple configurations as different types of removable non-volatile storage card. For example, in one embodiment, in which the removable non-volatile storage card 100 may be a CFEXPRESS TYPE A card and also may be used as a CFEXPRESS TYPE B card, when both sets of electrical contacts 208 and 210 are electrically connected to a host (e.g., via both sets of contact pins 102.1 through 102.N and contact pins 104.1 through 104.M), the controller 202 may determine that the removable non-volatile storage card 100 is being used as a CFEXPRESS TYPE B card and the controller 202 may perform all functions for a CFEXPRESS TYPE B card. If only the set of electrical contacts 208 are electrically connected to a host (e.g., via the set of contact pins 102.1 through 102.N), the controller 202 may determine that the removable non-volatile storage card 100 is being used as a CFEXPRESS TYPE A card and the controller 202 may perform all functions for a CFEXPRESS TYPE A card. In at least one embodiment, the controller 202 may be implemented in a semiconductor chip, such as a System On a Chip (SoC).

FIG. 3 schematically shows a card adapter 300 in accordance with an embodiment of the present disclosure. The card adapter 300 may comprise contact pins 302.1 through 302.N and 304.1 through 304.M to be electrically connected to a host. The card adapter 300 may also comprise contact pins 306.1 through 306.N and 308.1 through 308.M to be electrically connected to a removable non-volatile storage card. The contact pins 302.1 through 302.N may be electrically connected to contact pins 306.1 through 306.N, respectively. And the contact pins 304.1 through 304.M may be electrically connected to contact pins 308.1 through 308.M, respectively. The card adapter 300 may comprise a slot to accommodate the removable non-volatile storage card when it is inserted and the contact pins 306.1 through 306.N and 308.1 through 308.M may be on the surface of the slot to make contact with the contact pins of the removable non-volatile storage card. Thus, the contact pins 306.1 through 306.N and 308.1 through 308.M may be inside the card adapter 300 and not exposed on the package surface of the card adapter 300, and thus shown in dashed lines. In some embodiments, the contact pins 306.1 through 306.N and 308.1 through 308.M may be elastic contact pins to be pressed against the contact pins 102.1 through 102.N and 104.1 through 104.M of a removable non-volatile storage card 100 when the removable non-volatile storage card 100 is inserted in the card adapter 300.

In one embodiment, the dimension of the card adapter 300 may conform to the dimension specification of the CFEXPRESS Type B card. Also, the layout and position of the contact pins 302.1 through 302.N and 304.1 through 304.M may conform to the CFEXPRESS TYPE B card specification. That is, the contact pins 302.1 through 302.N and 304.1 through 304.M may have a total of 21 pins as specified and positioned according to the CFEXPRESS TYPE B card specification. It should be noted that the contact pins for the CFEXPRESS TYPE B card may be recessed pins and not exposed on the package surface of the card adapter 300, and thus the contact pins 302.1 through 302.N and 304.1 through 304.M may be shown in dashed lines. The slot of the card adapter 300 may accommodate a removable non-volatile storage card 100 for the removable non-volatile storage card 100 to be used as a CFEXPRESS TYPE B card.

Figure 4A:
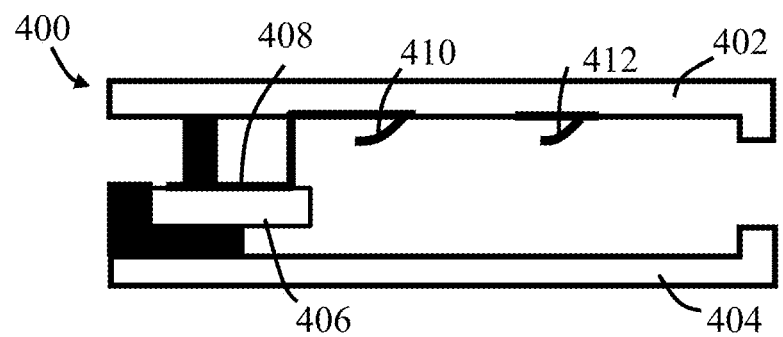
FIG. 4A schematically shows a cross-sectional view of a card adapter in accordance with an embodiment of the present disclosure.

FIG. 4A schematically shows a cross-sectional view of a card adapter 400 in accordance with an embodiment of the present disclosure. The card adapter 400 may include a first (e.g., front or top) cover 402, a second (e.g., back or bottom) cover 404 and a contact substrate 406. The contact substrate 406 may have a plurality of contact pins 408 arranged thereon. The first cover 402 may comprise a plurality of contact pins 410 and a plurality of contact pins 412. The card adapter 400 may be an embodiment of the card adapter 300. The plurality of contact pins 408 may be the contact pins 302.1 through 302.N and 304.1 through 304.M, the plurality of contact pins 410 may be the contact pins 306.1 through 306.N, and the plurality of contact pins 412 may be the contact pins 308.1 through 308.M. Each of the plurality of contact pins 410 and each of the plurality of contact pins 412 may be a respective elastic contact pin for making electrical contacts with respective contact pins of 102.1 through 102.N and 104.1 through 104.M of a removable non-volatile storage card 100 when the removable non-volatile storage card 100 is inserted into the card adapter 400.

Figure 4B:
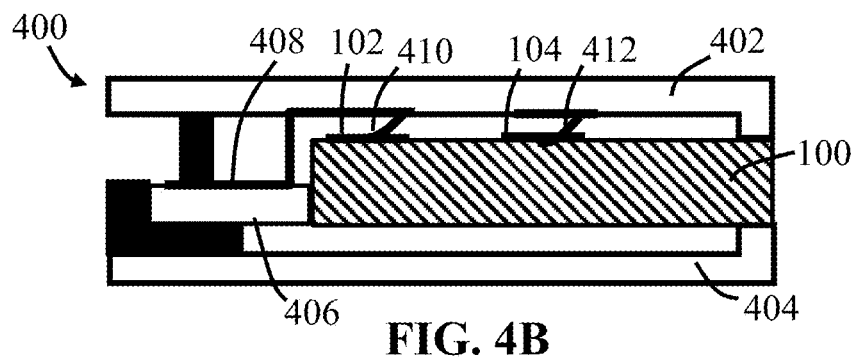
FIG. 4B schematically shows a cross-sectional view of a card adapter inserted with a removable non-volatile storage card in accordance with an embodiment of the present disclosure.

FIG. 4B schematically shows a cross-sectional view of the card adapter 400 inserted with a removable non-volatile storage card in accordance with an embodiment of the present disclosure. As shown in FIG. 4B, when a removable non-volatile storage card 100 is inserted inside the card adapter 400, respective contact pin of the contact pins 102 of the removable non-volatile storage card 100 may be positioned to make electrical contact with respective elastic contact pin of the elastic contact pins 410 of the card adapter 400, and respective contact pin of the contact pins 104 of the removable non-volatile storage card 100 may be positioned to make electrical contact with respective elastic contact pin of the elastic contact pins 412 of the card adapter 400. Also, as shown in FIG. 4B, the first cover 402 and the second cover 404 may form a slot such that the removable non-volatile storage card 100 when inserted may be suspended in the middle between the font cover 402 and the back cover 404. In some embodiments, there may be supporting elements (e.g., bumps and/or struts) on the back cover 404 to prop up the removable non-volatile storage card 100 and hold the removable non-volatile storage card 100 in position.

Figure 4C:
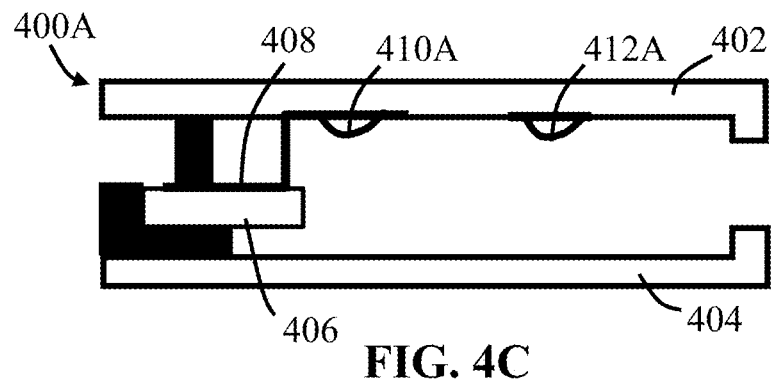
FIG. 4C schematically shows a cross-sectional view of a card adapter in accordance with another embodiment of the present disclosure.

FIG. 4C schematically shows a cross-sectional view of a card adapter 400A in accordance with another embodiment of the present disclosure. The card adapter 400A may be another embodiment of the card adapter 300 and a variation of the card adapter 400. In the card adapter 400, the elastic contact pins 410 and 412 may be open-ended. That is, one end of each of the elastic contact pins 410 and 412 may be coupled to a respective base on the first cover 402 and another end of each of the elastic contact pins 410 and 412 may dangle free. In contrast, the card adapter 400A may comprise elastic contact pins 410A and 412A that have closed structures. In one embodiment, the elastic contact pins 410A and 412A may be conductive strips (e.g., copper strips) with each one having both ends coupled to the respective bases on the first cover 402. In another embodiment, the elastic contact pins 410A and 412A may be circular conductive bumps protruding from the respective bases on the first cover 402. It should be noted that in some embodiments, some of the elastic contact pins 410A and 412A may be open ended and some may be closed.

Figure 5A:
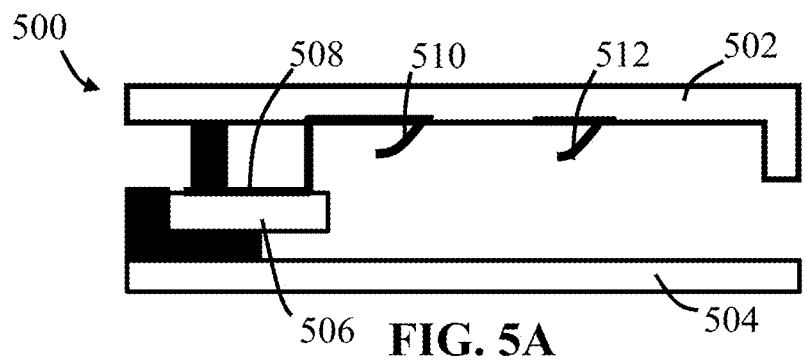
FIG. 5A schematically shows a cross-sectional view of a card adapter in accordance with another embodiment of the present disclosure.

FIG. 5A schematically shows a cross-sectional view of a card adapter 500 in accordance with another embodiment of the present disclosure. The card adapter 500 may include a first (e.g., front or top) cover 502, a second (e.g., back or bottom) cover 504 and a contact substrate 506. The contact substrate 506 may have a plurality of contact pins 508 arranged thereon. The first cover 502 may comprise a plurality of contact pins 510 and a plurality of contact pins 512. The card adapter 500 may be another embodiment of the card adapter 300. The plurality of contact pins 508 may be the contact pins 302.1 through 302.N and 304.1 through 304.M, the plurality of contact pins 510 may be the contact pins 306.1 through 306.N, and the plurality of contact pins 512 may be the contact pins 308.1 through 308.M. Each of the plurality of contact pins 510 and each of the plurality of contact pins 512 may be a respective elastic contact pin for making electrical contacts with respective contact pins of 102.1 through 102.N and 104.1 through 104.M of a removable non-volatile storage card 100 when the removable non-volatile storage card 100 is inserted into the card adapter 500. The slot of the card adapter 500 may be implemented such that the removable non-volatile storage card 100 when inserted may be positioned abut against the back cover 504.

Figure 5B:
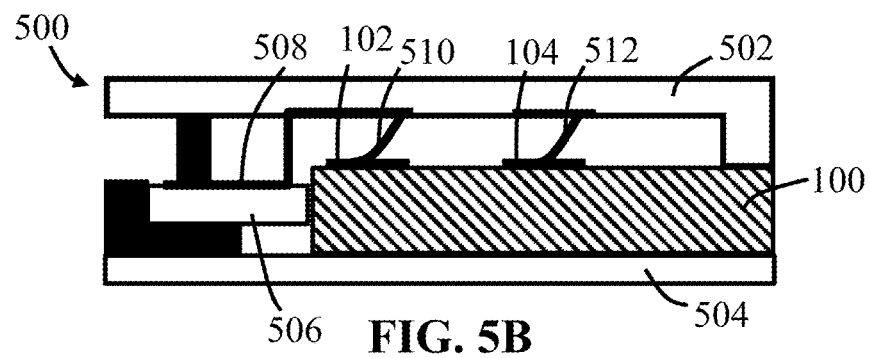
FIG. 5B schematically shows a cross-sectional view of a card adapter inserted with a removable non-volatile storage card in accordance with an embodiment of the present disclosure.

FIG. 5B schematically shows a cross-sectional view of the card adapter 500 inserted with a removable non-volatile storage card in accordance with an embodiment of the present disclosure. As shown in FIG. 5B, the first cover 502 and the second cover 504 may form a slot such that when a removable non-volatile storage card 100 is inserted inside the card adapter 500, the removable non-volatile storage card 100 may be positioned abut the back cover 504. The contact pins 102 of the removable non-volatile storage card 100 may be positioned to make electrical contact with the contact pins 510 of the card adapter 500, and the contact pins 104 of the removable non-volatile storage card 100 may be positioned to make electrical contact with the contact pins 512 of the card adapter 500.

Figure 5C:
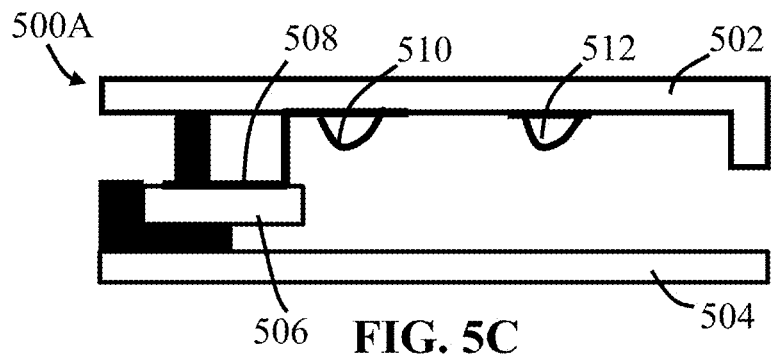
FIG. 5C schematically shows a cross-sectional view of a card adapter in accordance with another embodiment of the present disclosure.

FIG. 5C schematically shows a cross-sectional view of a card adapter in accordance with another embodiment of the present disclosure. The card adapter 500A may be another embodiment of the card adapter 300 and a variation of the card adapter 500. In the card adapter 500, the elastic contact pins 510 and 512 may be open ended. That is, one end of the elastic contact pins 510 and 512 may be coupled to a respective base on the first cover 502 and another end of the elastic contact pins may dangle free. In contrast, the card adapter 500A may comprise elastic contact pins 510A and 512A that have closed structures. In one embodiment, the elastic contact pins 510A and 512A may be conductive strips (e.g., copper strips) with both ends coupled to respective bases on the first cover 502. In another embodiment, the elastic contact pins 510A and 512A may be circular conductive bumps protruding from respective bases on the first cover 502. It should be noted that in some embodiments, some of the elastic contact pins 510A and 512A may be open ended and some may be closed.

In various embodiments, the positions and arrangement of contact pins 306.1 through 306.N and contact pins 308.1 through 308.M may be implemented corresponding to the positions and arrangement of contact pins 102.1 through 102.N and 104.1 through 104.M of a removable non-volatile storage card 100. In particular, if in one embodiment, the contact pins 104.1 through 104.M may be positioned in a position (or multiple positions) of a removable non-volatile storage card 100 different from FIG. 1A, the position of the contact pins 308.1 through 308.M may also be positioned correspondingly in an embodiment of the card adapter 300.

In an exemplary embodiment, there is provided an apparatus that may comprise a package having a first set of contact pins and a second set of contact pins. The package may have a dimension in accordance with a specification of a first type of storage device. The first set of contact pins may be arranged according to the specification of the first type of storage device. The second set of contact pins may be configured to conduct a subset of electrical signals for a second type of storage device. The package may further comprise a controller inside the package, and the controller may be configured to function as the first type of storage device when the first set of contact pins are electrically connected to a host and as the second type of storage device when both the first set of contact pins and the second set of contact pins are electrically connected to the host.

In one embodiment, the first type of storage device may be CFEXPRESS TYPE A card and the second type of storage device may be CFEXPRESS TYPE B card.

In one embodiment, the second set of contact pins may be positioned and exposed on a same surface of the first set of contact pins.

In one embodiment, the second set of contact pins may be positioned and exposed on a first surface of the package opposite a second surface on which the first set of contact pins are positioned and exposed.

In one embodiment, at least one of the second set of contact pins may be positioned and exposed on a same surface as the first set of contact pins.

In one embodiment, at least one of the second set of contact pins may be positioned and exposed on a first surface of the package opposite a second surface on which the first set of contact pins are positioned and exposed.

In one embodiment, the apparatus may further comprise a card adapter with the package inserted therein. The card adapter may have a dimension in accordance with a specification of the second type of storage device and comprise a set of recessed pins arranged in accordance with the specification of the second type of storage device, and two sets of elastic contact pins pressed against the first of contact pins and the second set of contact pins of the package to make electrical contact with the first of contact pins and the second set of contact pins of the package. The two sets of elastic contact pins may be electrically connected to the set of recessed pins.

In one embodiment, the first type of storage device may be CFEXPRESS TYPE A card and the second type of storage device is CFEXPRESS TYPE B card.

In one embodiment, at least one of the two sets of elastic contact pins may be an open-ended conductive strip.

In one embodiment, at least one of the two sets of elastic contact pins may have a closed structure.

In another exemplary embodiment, there is provided an apparatus that may comprise a first cover and a second cover forming a slot between the first cover and the second cover, and a first set of elastic contact pins and a second set of elastic contact pins arranged in an inner surface of the slot. The slot may have a dimension in accordance with a specification of a first type of storage device, the first cover and the second cover forming a card shape may have a dimension in accordance with a specification of a second type of storage device. The first set of elastic contact pins may be arranged to make electrical contact with a first set of contact pins of a removable non-volatile storage card according to the specification of the first type of storage device, the second set of elastic contact pins may be arranged to make electrical contact with a second set of contact pins of the removable non-volatile storage card to conduct a subset of electrical signals for the second type of storage device. The apparatus may further comprise a set of recessed pins arranged in accordance with a specification of the second type of storage device. The set of recessed pins may be electrically connected to the first set and second set of elastic contact pins.

In one embodiment, the first type of storage device may be CFEXPRESS TYPE A card and the second type of storage device may be CFEXPRESS TYPE B card.

In one embodiment, at least one elastic contact pin of the first set of elastic contact pins and the second set of elastic contact pins may be an open-ended conductive strip.

In one embodiment, at least one elastic contact pin of the first set of elastic contact pins and the second set of elastic contact pins may have a closed structure.

In one embodiment, the apparatus may further comprise the removable non-volatile storage card removably inserted in the slot. The removable non-volatile storage card may comprise a package having the first set of contact pins and the second set of contact pins. The package may further comprise a controller inside the package, and the controller may be configured to function as the first type of storage device when the first set of contact pins are electrically connected to a host and as the second type of storage device when both the first set of contact pins and the second set of contact pins are electrically connected to the host.

In one embodiment, the second set of contact pins may be positioned and exposed on a same surface of the removable non-volatile storage card as the first set of contact pins.

In one embodiment, the second set of contact pins may be positioned and exposed on a first surface of the package of the removable non-volatile storage card opposite a second surface on which the first set of contact pins are positioned and exposed.

In one embodiment, at least one of the second set of contact pins may be positioned and exposed on a same surface of the removable non-volatile storage card as the first set of contact pins.

In one embodiment, at least one of the second set of contact pins may be positioned and exposed on a first surface of the package of the removable non-volatile storage card opposite a second surface on which the first set of contact pins are positioned and exposed.

In one embodiment, the first type of storage device may be CFEXPRESS TYPE A card and the second type of storage device may be CFEXPRESS TYPE B card.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus, comprising:
a package having a first set of contact pins and a second set of contact pins, the package having a dimension in accordance with a specification of a first type of storage device and the first set of contact pins being arranged according to the specification of the first type of storage device, the second set of contact pins being configured to conduct a subset of electrical signals for a second type of storage device,
wherein the package further comprises a controller inside the package, and the controller is configured to function as the first type of storage device when the first set of contact pins are electrically connected to a host and as the second type of storage device when both the first set of contact pins and the second set of contact pins are electrically connected to the host, and wherein at least one pin of the second set of contact pins is positioned and exposed on a first surface of the package opposite a second surface on which the first set of contact pins are positioned and exposed, wherein the first type of storage device is CFEXPRESS TYPE A card and the second type of storage device is CFEXPRESS TYPE B card and at least one of the second set of contact pins is positioned and exposed on a same surface as the first set of contact pins.

2. A system comprising a removable non-volatile storage card and an apparatus, the apparatus comprising:
a first cover and a second cover forming a slot between the first cover and the second cover, the slot having a dimension in accordance with a specification of a first type of storage device, the first cover and the second cover forming a card shape having a dimension in accordance with a specification of a second type of storage device;
a first set of elastic contact pins and a second set of elastic contact pins arranged in an inner surface of the slot, the first set of elastic contact pins arranged to make electrical contact with a first set of contact pins of the removable non-volatile storage card according to the specification of the first type of storage device, the second set of elastic contact pins being arranged to make electrical contact with a second set of contact pins of the removable non-volatile storage card to conduct a subset of electrical signals for the second type of storage device; and
a set of recessed pins arranged in accordance with the specification of the second type of storage device, the set of recessed pins being electrically connected to the first set and second set of elastic contact pins;
wherein the removable non-volatile storage card is removably inserted in the slot, wherein the removable non-volatile storage card comprises a package having the first set of contact pins and the second set of contact pins, the package further comprises a controller inside the package, and the controller is configured to function as the first type of storage device when the first set of contact pins are electrically connected to a host and as the second type of storage device when both the first set of contact pins and the second set of contact pins are electrically connected to the host, and wherein at least one pin of the second set of contact pins is positioned and exposed on a first surface of the package of the removable non-volatile storage card opposite a second surface on which the first set of contact pins are positioned and exposed.

3. The system of claim 2, wherein the first type of storage device is CFEXPRESS TYPE A card and the second type of storage device is CFEXPRESS TYPE B card.

4. The system of claim 2, wherein at least one elastic contact pin of the first set of elastic contact pins and the second set of elastic contact pins is an open-ended conductive strip.

5. The system of claim 2, wherein at least one elastic contact pin of the first set of elastic contact pins and the second set of elastic contact pins has a closed structure.

6. The system of claim 2, wherein the second set of contact pins are positioned and exposed on the first surface of the package of the removable non-volatile storage card.

7. The system of claim 2, wherein at least one of the second set of contact pins is positioned and exposed on a same surface of the removable non-volatile storage card as the first set of contact pins.

* * * * *